(12) United States Patent
Noah

(10) Patent No.: US 8,651,224 B2
(45) Date of Patent: Feb. 18, 2014

(54) POWER STEERING APPARATUS

(75) Inventor: Bruce C. Noah, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 206 days.

(21) Appl. No.: 13/353,425

(22) Filed: Jan. 19, 2012

(65) Prior Publication Data

US 2013/0186704 A1 Jul. 25, 2013

(51) Int. Cl.
*B62D 5/06* (2006.01)

(52) U.S. Cl.
USPC .......................................................... 180/421

(58) Field of Classification Search
USPC ................................................ 180/421, 422
See application file for complete search history.

(56) References Cited

U.S. PATENT DOCUMENTS

| | | | |
|---|---|---|---|
| 4,412,789 A | 11/1983 | Ohe et al. | |
| 4,616,728 A | 10/1986 | Suzuki et al. | |
| 4,798,256 A * | 1/1989 | Fassbender | 180/406 |
| 5,226,802 A | 7/1993 | Nakamura et al. | |
| 5,634,527 A | 6/1997 | Emori | |
| 5,842,837 A * | 12/1998 | Nakayoshi et al. | 417/286 |
| 6,173,728 B1 * | 1/2001 | Venable et al. | 137/112 |
| 6,354,393 B1 * | 3/2002 | Ahlert et al. | 180/403 |
| 7,510,044 B2 | 3/2009 | Williams | |
| 7,837,001 B2 | 11/2010 | Young et al. | |
| 8,348,635 B2 * | 1/2013 | Yamashita et al. | 417/307 |

* cited by examiner

*Primary Examiner* — Kevin Hurley
(74) *Attorney, Agent, or Firm* — Tarolli, Sundheim, Covell & Tummino LLP

(57) ABSTRACT

An apparatus for use in turning steerable vehicle wheels includes a first pump driven by an engine of the vehicle to supply fluid under pressure to a power steering motor assembly through a supply conduit. A second pump driven by the engine of the vehicle supplies fluid under pressure to the power steering motor assembly when the flow of fluid in the supply conduit is below a predetermined value. The second pump is inactive when the flow of fluid in the supply conduit is above the predetermined value. The second pump has vanes located in slits. A valve which is in fluid communication with the slits has a first condition in which fluid under pressure is supplied to the slits. The valve has a second condition in which the slits are in fluid communication with a reservoir.

16 Claims, 1 Drawing Sheet

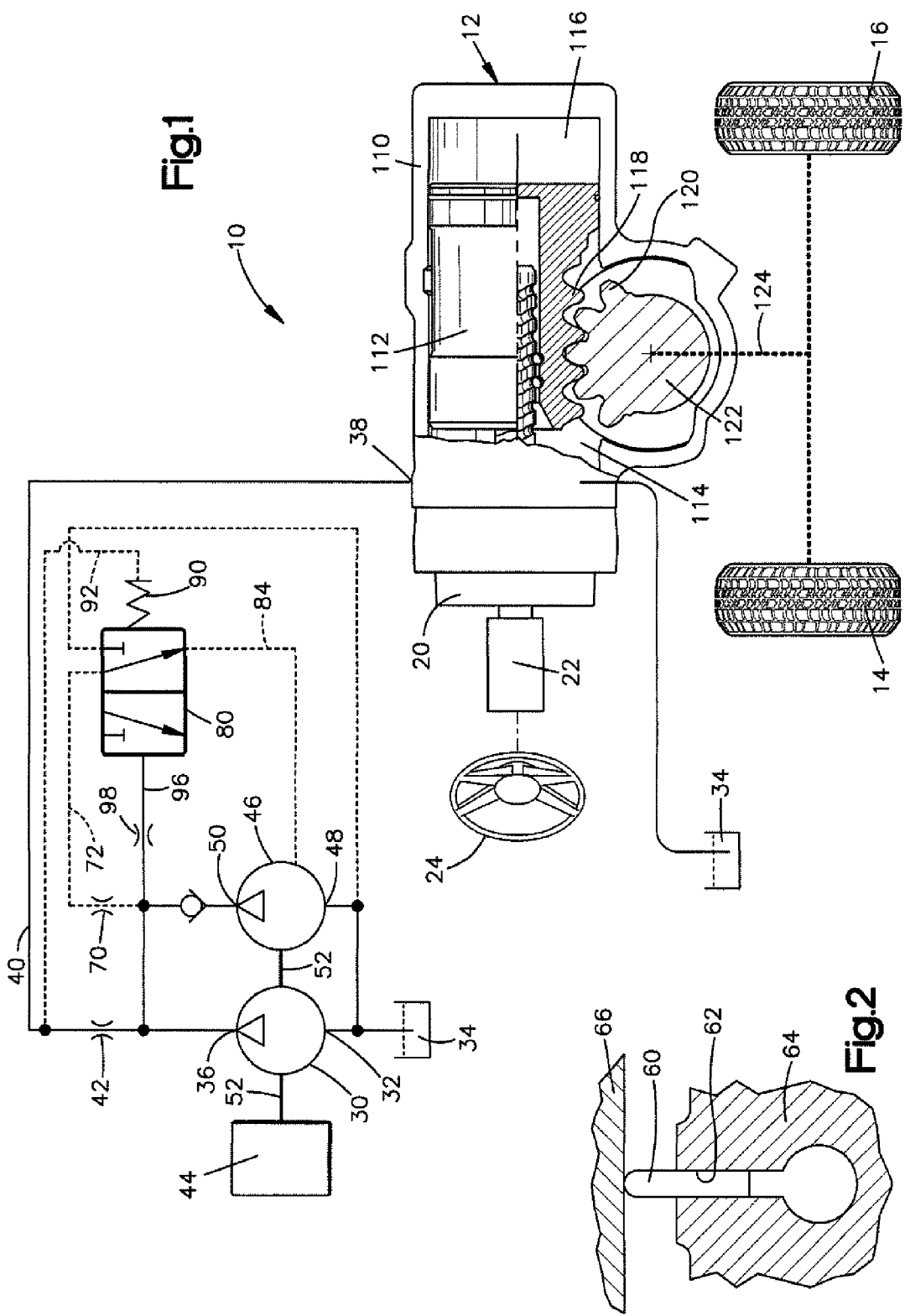

POWER STEERING APPARATUS

BACKGROUND OF THE INVENTION

The present invention is directed to an apparatus for use in turning steerable vehicle wheels.

A known apparatus for use in turning steerable vehicle wheels includes a power steering pump. The power steering pump is typically sized to provide maximum rated flow required to dry park a vehicle at engine idle. At highway speeds the engine can operate at two or three times its idle speed. Therefore, the fixed displacement power steering pump may provide excess flow and excess pressure at highway speeds. Excess flow from the power steering pump is diverted away from a hydraulic steering gear by a flow control valve. Therefore, only the rated flow is received by the hydraulic steering gear. Power consumed by this known system is determined by total flow delivered by the pump as a function of engine speed and the pressure drop of the steering system. One known power steering system having this general construction is disclosed in U.S. Pat. No. 5,184,693.

SUMMARY OF THE INVENTION

The present invention is directed to an apparatus for use in turning steerable vehicle wheels including a power steering motor assembly connected with the steerable vehicle wheels. A first pump driven by an engine of the vehicle supplies fluid under pressure to the power steering motor assembly through a supply conduit. A second pump connected with the power steering motor assembly is driven by the engine of the vehicle to supply fluid under pressure to the power steering motor assembly through the supply conduit. The second pump supplies fluid under pressure to the power steering motor assembly when the flow of fluid in the supply conduit is below a predetermined value. The second pump is inactive when the flow of fluid in the supply conduit is above the predetermined value.

In another aspect of the present invention an apparatus for use in turning steerable vehicle wheels includes a power steering motor assembly connected with the steerable vehicle wheels. A first pump which is in fluid communication with the power steering motor assembly is continuously driven by an engine of the vehicle, during operation of the engine, to supply fluid under pressure to the power steering motor assembly through a supply conduit. A second pump which is in fluid communication with the power steering motor assembly and driven by the engine of the vehicle, during operation of the engine, supplies fluid under pressure to the power steering motor assembly. The second pump has vanes located in slits. A valve which is in fluid communication with the slits has a first condition in which fluid under pressure is supplied to the slits. The valve has a second condition in which the slits are in fluid communication with a reservoir. The valve moves from the first condition to the second condition in response to a predetermined vehicle operating condition.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of a power steering apparatus constructed and operated in accordance with the present invention; and FIG. 2 is a schematic illustration of a portion of a pump of the power steering apparatus of FIG. 1.

DESCRIPTION OF SPECIFIC PREFERRED EMBODIMENTS OF THE INVENTION

A vehicle steering apparatus 10 constructed in accordance with the present invention is illustrated in FIG. 1. The vehicle steering apparatus 10 includes a hydraulic power steering motor assembly 12 which is connected with steerable vehicle wheels 14 and 16. A steering control valve 20 is connected with the power steering motor assembly 12. The steering control valve 20 has an input shaft 22 which is connected with a manually rotatable vehicle steering wheel 24. The steering control valve 20 may be an open center control valve.

A first pump 30 has a fluid input 32 connected in fluid communication with a fluid reservoir 34. A fluid output 36 of the first pump 30 is connected in fluid communication with a fluid inlet 38 of the steering control valve 20 by a fluid supply conduit 40. The fluid output 36 is in fluid communication with an upstream side of a fixed area orifice 42 in the fluid supply conduit 40. The first pump 30 is continuously driven by an engine 44 of the vehicle, during operation of the engine. Therefore, during operation of the engine 44, the pump 30 continuously supplies fluid under pressure to the power steering motor assembly 12.

A second pump 46 has a fluid input 48 connected in fluid communication with the fluid reservoir 34. A fluid output 50 of the second pump 46 is connected in fluid communication with the fluid supply conduit 40 at an upstream side of the fixed area orifice 42. The second pump 46 is continuously driven by the engine 44 of the vehicle, during operation of the engine. It is contemplated that the first and second pumps 30 and 46 may form a tandem pump and be mounted on the same output shaft 52 of the engine 42.

The second pump 46 is a vane pump, as known in the art. The second pump 46 has vanes 60 (FIG. 2) defining pumping chambers. Each of the vanes 60 is located in a slit 62 in a rotor 64 of the pump 46. The bottoms of the slits 62 receive fluid pressure to move the vanes 60 into engagement with the stator or housing 66 of the pump 46 and define the pumping chambers.

The fluid outputs 36 and 50 of the first and second pumps 30 and 46 are also in fluid communication with an upstream side of a fixed area orifice 70 in a conduit 72. The downstream side of the fixed area orifice 70 is in fluid communication with a valve 80 through the conduit 72. The valve 80 is connected in fluid communication with the slits 62 behind the vanes 60 of the second pump 46 by a conduit 84.

The valve 80 operates to place the slits 62 behind the vanes 60 of the second pump 46 in fluid communication with either the reservoir 34 or the downstream side of the fixed area orifice 70 and the outputs 36 and 50 of the first and second pumps 30 and 46. When the valve 80 is in a first condition, shown in FIG. 1, the downstream side of the fixed area orifice 70 and the outputs 36 and 50 of the first and second pumps 30 and 46 are in fluid communication with the slits 62 behind the vanes 60 of the second pump 46. Therefore, pressurized fluid is conducted to the slits 62 behind the vanes 60. The vanes 60 move radially outwardly relative to the rotor 64 into engagement with the stator or housing 66 to form pumping chambers. When the valve 80 is in the first condition both the first pump 30 and the second pump 46 are being driven by the engine 42. Therefore, the fluid flow from the second pump 46 joins the fluid flow from the first pump 30. The combined fluid flow is conducted to the power steering motor assembly 12.

When the valve 80 is in a second condition, the reservoir 34 is in fluid communication with the slits 62 behind the vanes 60 of the second pump 46. When the valve 80 is in the second condition, the vanes 62 of the second pump 46 are spaced from the stator or housing 66. Accordingly, the second pump 46 does not pump fluid and only the first pump 30 supplies fluid to the power steering motor assembly 12 when the valve 80 is in the second condition The valve 80 moves from the first condition to the second condition upon the occurrence of a predetermined vehicle operating condition. In the illustrated embodiment of the invention, the predetermined operating condition occurs when the flow of fluid in the supply conduit 40 is above a predetermined value. The flow of fluid in the supply conduit 40 is above the predetermined value when the pressure drop across the fixed area orifice 42 in the fluid supply conduit 40 is above a predetermined value. This may occur when the vehicle is cruising at highway speeds and the steering wheel 24 is rotated.

The valve 80 includes a spring 90 at a first end urging the valve toward the first condition. The first end of the valve 80 is also in fluid communication with the downstream side of the fixed area orifice 42 through a conduit 92. The second opposite end of the valve 80 is in fluid communication with the upstream side of the fixed area orifice 42 and the outputs 36 and 50 of the first and second pumps 30 and 46 through a conduit 96. The conduit 96 may include a fixed area orifice 98.

The valve 80 moves from the first condition to the second condition under the influence of fluid pressure conducted from the upstream side of the fixed area orifice 42 and the outputs 36 and 50 of the first and second pumps 30 and 46. The fluid pressure at the downstream side of the fixed area orifice 42 resists movement of the valve 80 toward the second condition along with the spring 90. Therefore, when the flow of fluid in the supply conduit 40 is above the predetermined value, as indicated by the pressure drop across the fixed area orifice 42 in the supply conduit 40 being above the predetermined value, the valve 80 moves from the first condition to the second condition. It is contemplated that the valve 80 moves from the first condition to the second condition when the engine speed is above a predetermined level and the steering wheel 24 is rotated. This may occur when the vehicle is traveling at highway speeds.

The valve 80 moves from the second condition to the first condition when the flow of fluid in the supply conduit 40 is below the predetermined value. The pressure drop across the fixed area orifice 42 in the supply conduit 40 is below the predetermined value when the flow of fluid in the supply conduit is relatively low. It is contemplated that the valve 80 moves from the second condition to the first condition when the engine 44 is idling or below a predetermined speed and the steering wheel 24 is rotated.

The power steering motor assembly 12 may be of the well known integral type and includes a housing 110 which encloses a piston 112. The piston 112 cooperates with the housing 110 to define a head end chamber 114 and a rod end chamber 116. The steering control valve 20 controls fluid flow to and from the head and rod end chambers 114 and 116 in a known manner in response to rotation of the steering wheel 24. Fluid discharged from the power steering motor assembly 12 is conducted to the reservoir 34.

The piston 112 has a linear array 118 of rack teeth which are disposed in meshing engagement with an arcuate array of pinion teeth 120. The pinion teeth 120 are disposed on a sector gear 122 which is connected with a steering linkage 124. The power steering motor assembly 12 has a known construction which is generally similar to the construction of the power steering motor assembly disclosed in U.S. Pat. No. 6,546,322. Of course, the power steering motor assembly may have a different type of construction if desired.

When a vehicle in which the engine 44 is disposed is performing maneuvers similar to parking maneuvers, the speed of operation of the engine is at or near idle and below the predetermined speed. When this occurs, the flow of fluid in the supply conduit 40 is relatively low and the pressure drop across the fixed area orifice 42 is below the predetermined value. The valve 80 is in the first condition shown in FIG. 1 due to the relatively low pressure drop across the fixed area orifice 42. The valve 80 places outputs 36 and 50 of the first and second pumps 30 and 46 in fluid communication with the slits 62 behind the vanes 60. The vanes 60 engage the stator or housing 66 to form pumping chambers. The fluid outputs 36 and 50 from the first and second pumps 30 and 46 are combined to move the piston 112 relative to the housing 110 and steer the steerable vehicle wheels 14, 16. This provides a flow of fluid which can satisfy the demands of the power steering motor assembly 12.

When a vehicle in which the engine 44 is disposed is being driven along a highway at normal cruising speeds and the steering wheel 24 is rotated, the fluid flow in the supply conduit 40 is above the predetermined value and the pressure drop across the fixed area orifice 42 in the conduit 40 is above the predetermined value. Therefore, the valve 80 is in the second condition. The reservoir 34 is in fluid communication with the slits 62 behind the vanes 60 in the second pump 46. The vanes 60 collapse and move out of engagement with the stator or housing 66. The second pump 46 becomes inactive. Accordingly, only the first pump 30 supplies fluid to the power steering motor assembly 12.

From the above description of the invention, those skilled in the art will perceive applications, improvements, changes and modifications to the present invention. Such applications, improvements, changes and modifications within the skill of the art are intended to be covered by the appended claims.

Having described the invention, the following is claimed:

1. An apparatus for use in turning steerable vehicle wheels, said apparatus comprising:
   a power steering motor assembly connected with the steerable vehicle wheels;
   a first pump driven by an engine of the vehicle to supply fluid under pressure to said power steering motor assembly through a supply conduit; and
   a second pump which is connected with said power steering motor assembly and is driven by the engine of the vehicle to supply fluid under pressure to said power steering motor assembly through the supply conduit, said second pump supplying fluid under pressure to said power steering motor assembly when the flow of fluid in the supply conduit is below a predetermined value, said second pump being inactive when the flow of fluid in the supply conduit is above the predetermined value.

2. An apparatus as set forth in claim 1 wherein said first pump continuously supplies fluid to said power steering motor assembly during operation of the engine.

3. An apparatus as set forth in claim 1 wherein said second pump includes vanes located in slits, said slits being in fluid communication with a fluid reservoir when the flow of fluid in the supply conduit is above the predetermined value, said vanes being spaced from a stator of said second pump when said slits are in fluid communication with the fluid reservoir.

4. An apparatus as set forth in claim 3 wherein said slits are in fluid communication with fluid outputs of said first and second pumps when the flow of fluid in the supply conduit is below the predetermined value.

5. An apparatus as set forth in claim 3 wherein a valve is connected in fluid communication with said slits, said valve having a first condition in which the valve directs fluid flow from outputs of said first and second pumps to said slits when the flow of fluid in the supply conduit is below the predetermined value, said valve having a second condition in which the valve places said slits in fluid communication with the reservoir when the flow of fluid in the supply conduit is above the predetermined value.

6. An apparatus as set forth in claim 5 wherein a fixed area orifice is located in said supply conduit, a pressure at an upstream side of said fixed area orifice urges said valve toward the second condition, a pressure at a downstream side of said fixed area orifice urges said valve toward the first condition.

7. An apparatus as set forth in claim 6 wherein a spring urges said valve toward the first condition.

8. An apparatus as set forth in claim 1 wherein said first and second pumps are mounted on the same shaft.

9. An apparatus as set forth in claim 8 wherein said first and second pumps form a tandem pump.

10. An apparatus for use in turning steerable vehicle wheels, said apparatus comprising:
   a power steering motor assembly connected with the steerable vehicle wheels;
   a first pump which is in fluid communication with said power steering motor assembly and is continuously driven by an engine of the vehicle, during operation of the engine, to supply fluid under pressure to said power steering motor assembly through a supply conduit;
   a second pump which is in fluid communication with said power steering motor assembly and driven by the engine of the vehicle, during operation of the engine, to supply fluid under pressure to said power steering motor assembly, said second pump having vanes located in slits; and
   a valve which is in fluid communication with said slits, said valve having a first condition in which fluid under pressure is supplied to said slits, said valve having a second condition in which said slits are in fluid communication with a reservoir, said valve moving from the first condition to the second condition in response to a predetermined vehicle operating condition.

11. An apparatus as set forth in claim 10 wherein said valve directs fluid flow from outputs of said first and second pumps to said slits when in the first condition.

12. An apparatus as set forth in claim 10 wherein said valve moves from the first condition to the second condition when the flow of fluid in said supply conduit is above a predetermined value.

13. An apparatus as set forth in claim 12 wherein a fixed area orifice is located in said supply conduit, a pressure at an upstream side of said fixed area orifice urges said valve toward the second condition, a pressure at a downstream side of said fixed area orifice urges said valve toward the first condition.

14. An apparatus as set forth in claim 13 wherein a spring urges said valve toward the first condition.

15. An apparatus as set forth in claim 10 wherein said first and second pumps are mounted on the same shaft.

16. An apparatus as set forth in claim 15 wherein said first and second pumps form a tandem pump.

* * * * *